Dec. 2, 1952 J. JORDAN 2,619,701
CUP HANDLING MACHINE
Filed April 8, 1949 7 Sheets-Sheet 1

Inventor,
Jacob Jordon.

Ely + Frye
By, Attorneys.

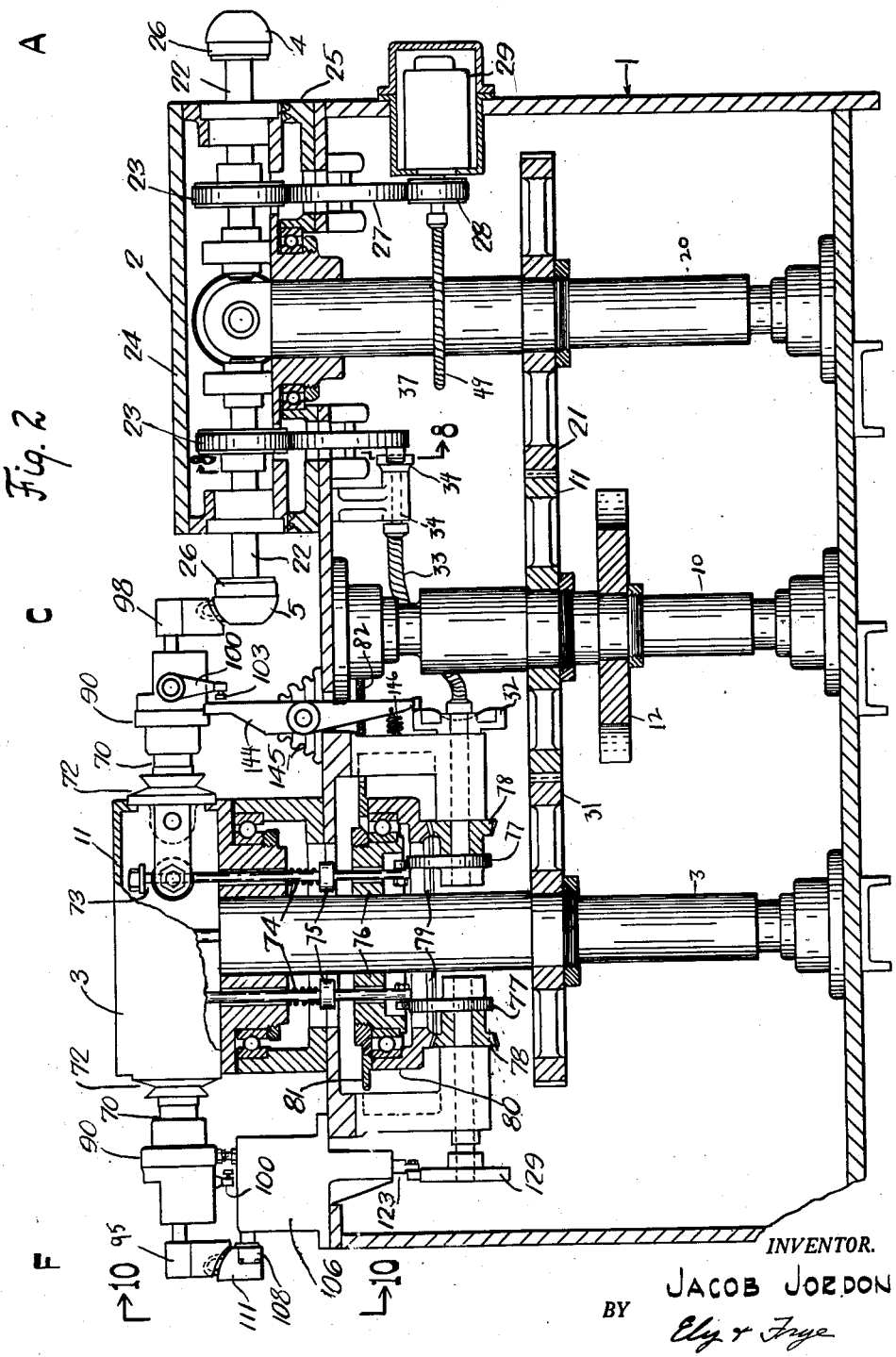

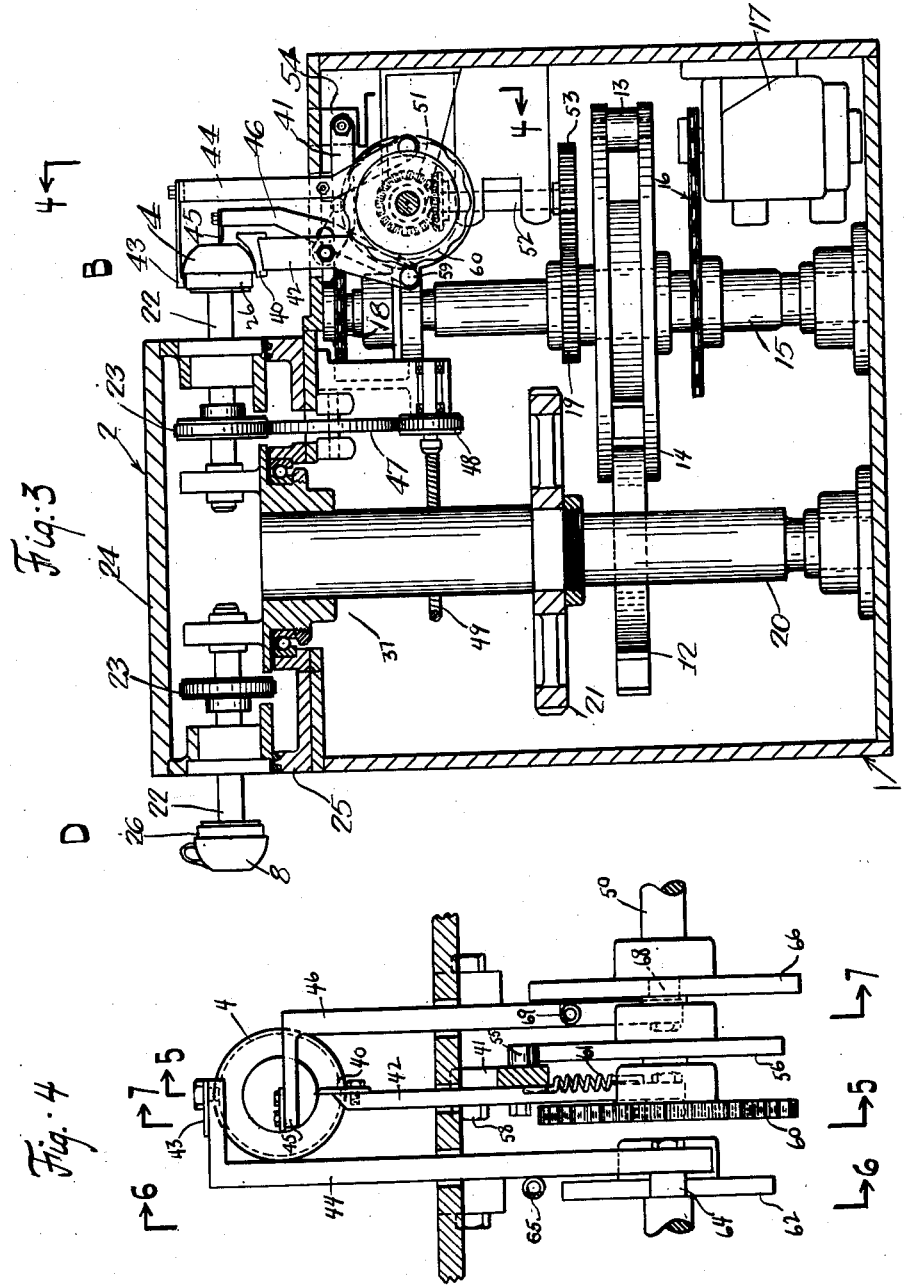

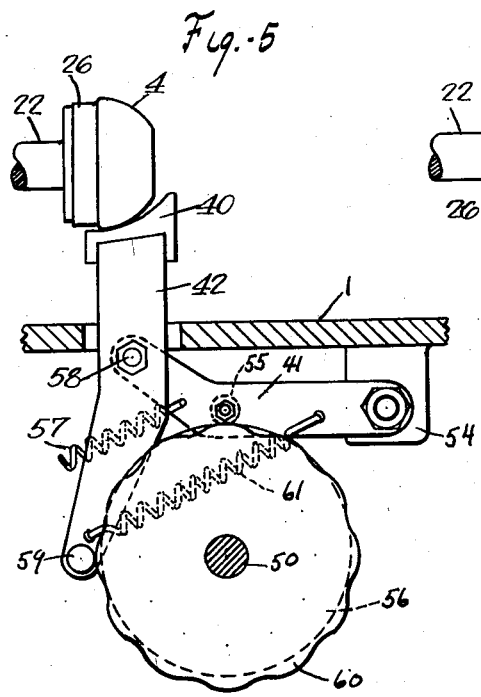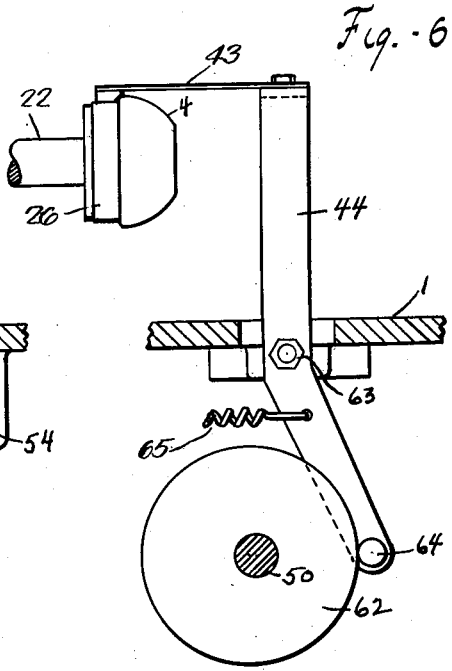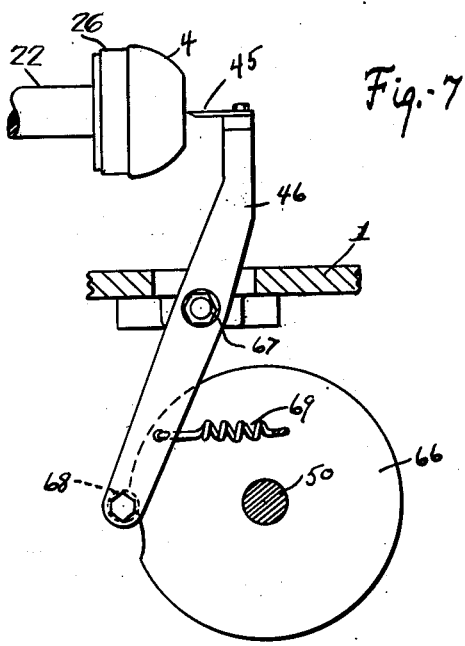

Dec. 2, 1952          J. JORDAN          2,619,701
CUP HANDLING MACHINE
Filed April 8, 1949                 7 Sheets-Sheet 5
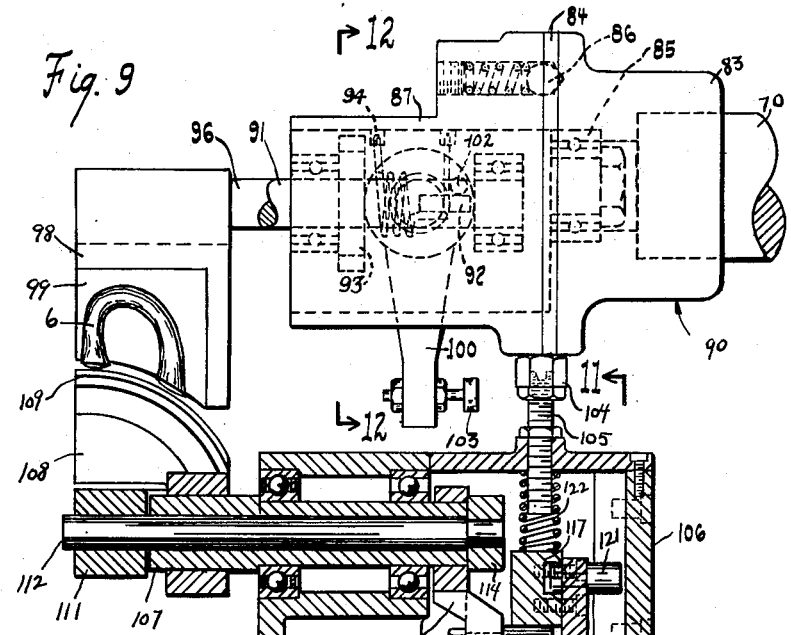
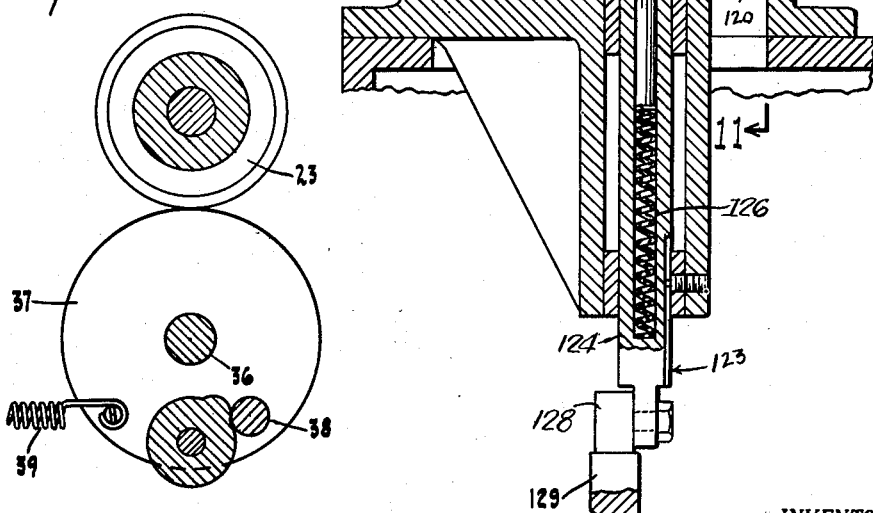
INVENTOR.
JACOB JORDON
BY
Ely & Frye
ATTORNEY Dec. 2, 1952 J. JORDAN 2,619,701
CUP HANDLING MACHINE
Filed April 8, 1949 7 Sheets-Sheet 6

INVENTOR.
JACOB JORDON
BY Ely & Frye
ATTORNEY

Dec. 2, 1952 J. JORDAN 2,619,701
CUP HANDLING MACHINE
Filed April 8, 1949 7 Sheets-Sheet 7
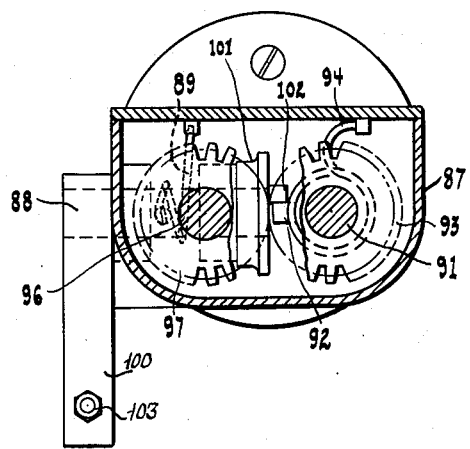
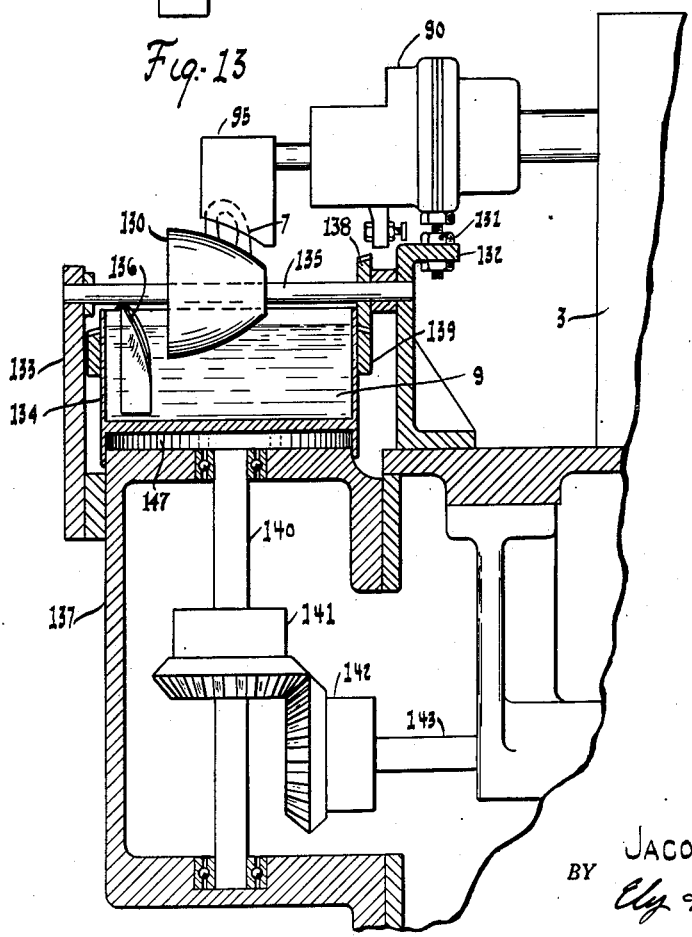
INVENTOR.
JACOB JORDON
BY Ely & Frye
ATTORNEY Patented Dec. 2, 1952

2,619,701

UNITED STATES PATENT OFFICE 2,619,701

CUP HANDLING MACHINE

Jacob Jordan, New Castle, Pa., assignor, by mesne assignments, to Peoples First National Bank & Trust Company, Pittsburgh, Pa., a national banking association Application April 8, 1949, Serial No. 86,260

10 Claims. (Cl. 25—22)

This invention relates to a machine for forming handled cups or other hollow ware of china and like ceramic ware, and more particularly, to a machine which automatically turns and shapes the outer surface of a jiggered cup body, trims cast cup handles to fit the handles to the contour of the cup body, and then sticks the handle accurately to the turned cup body.

Heretofore the above operations in forming and handling jiggered cups have largely been manual operations in ceramic plants. That is, to form a cup, plastic clay is jiggered in a suitable jigger mold to form a rough cup blank of green ware, in which the inside of the cup is shaped. The blank is then placed in a suitable drier to dry and "temper" the green ware until it is suitable for turning. The green cup blank is then placed on a chuck in a turning lathe, where a turner, using a series of shaped-edge gouges, manually forms the foot, the outer contour of the cup, and the rim of the cup; although the rate of cut is much faster because the material is softer, the turning operation does not initially appear to be too dissimilar to the hand turning of wood, rough and finish cuts being taken and care having to be exercised to avoid tearing and spoiling the work due to chattering of the tool and the taking of rough cuts which are too deep.

Because turners are the most highly skilled, and, therefore, the most highly paid workers in clay fabricating shops, numerous efforts have been made to develop automatic clay turning machines similar to automatic wood turning machines. Such efforts have not been successful, however, due to the failure to appreciate the different tool manipulations required in turning soft green clay.

The handles for jiggered and turned cup bodies as described above are usually cast in multiple cavity casting molds. When removed from the casting mold and tempered by partial, but not complete, drying, the ends of the handle blanks are enlarged. These enlarged ends are pared and trimmed with a hand knife to provide a sharp-edged, generally curved, surface transverse to the general plane of the handle and conforming to the contour of the outer surface of the cup body at the points where the handle is to be placed. This is slow, painstaking, and tedious work, even though the girls who generally perform it are not rated as being as highly skilled as the cup turners mentioned above. Even skilled handle trimmers cause a considerable amount of spoilage. The enlarged ends of the handle blanks are never uniformly dried and tempered; the centers of the enlarged end portions are soft and, frequently, still liquid at the time the blanks are trimmed. Such soft centers will cause the knife to slip and spoil the piece as it is held and cut against the thumb. Efforts have been made to develop machines for tirmming handles, but as yet none had been able to duplicate the instructive skill in manipulating the trimming knife and supporting the trimmed edge with the thumb, as is developed in the manual operation.

After the cup bodies are turned and the handles trimmed, the trimmed ends of the handles are dipped in an adhesive clay slip and stuck by hand on the cup bodies. The green ware is then sponged and placed on the drier tray for final drying before firing. Because the contour of the cup body and the contour of the trimmed handle are determined by the eye of the artisan, substantial variations in these contours were inevitably encountered. A girl sticking handles can usually adjust the position of the handle on the cup bodies so that the contoured surfaces will mate, but, as would be expected, a number of trimmed handles must be discarded because of improper contour and a number of handles are crookedly placed. So far as is known, no one has yet attempted to provide a machine for accomplishing the manual operation of sticking a trimmed handle to a cup.

It is the object of this invention to provide a machine which will automatically accomplish the foregoing operations of turning the cup blank, trimming the cast handle, and sticking the trimmed handle to the cup body, only relatively unskilled labor being required to load and unload the machines and to sponge the ware. It is an advantage of my invention that, not only is more precisely contoured ware with straight handles produced, but spoilage is reduced and the labor involved is greatly reduced. For example, whereas the former operation of trimming and sticking the handles and sponging the ware alone (disregarding the labor of turning the ware) was most efficiently performed with a crew of three girls who handled an average of 130 dozen cups per shift, a crew of four, i. e. a cup blank loader, a handle blank loader, and unloader and a sponger can produce 400 dozen cups per shift with my machine. My machine also has the further advantage of eliminating the labor and material handling equipment (e. g. conveyors, trucks, trays, etc.) involved in transferring the turned cup from the turner to the handle sticking crew.

Other and further advantages of my invention will be apparent from the following specification and drawings of a preferred embodiment of my machine, in which Fig. 1 is a plan view of a machine made according to my invention.

Fig. 2 is a vertical section taken along the line 2—2 of Fig. 1.

Fig. 3 is a vertical section taken along the line 3—3 of Fig. 1.

Fig. 4 is a detail elevation, from the planes of the line 4—4 of Fig. 3, of the turning station and cam shaft assembly.

Fig. 5 is a detail elevation, from the plane of line 5—5 of Fig. 4, of the cup turning tool, cam, and cam-follower linkage.

Fig. 6 is a detail elevation, from the plane of the line 6—6 of Fig. 4, of the lip turning tool, cam, and cam-follower linkage.

Fig. 7 is a detail elevation, from the line 7—7 of Fig. 4, of the foot-facing tool, cam, and cam follower linkage.

Fig. 8 is a detail elevation of the cup sticking cam taken from the plane of the line 8—8 of Fig. 2.

Fig. 9 is a detail section at the handle trimming station taken along the line 9—9 of Fig. 10.

Fig. 12 is a detail cross-section taken along the line 12—12 of Fig. 9.

Fig. 13 is a detail cross-section taken along the line 13 of Fig. 1.

Turrets and turret drive

Figure 1:
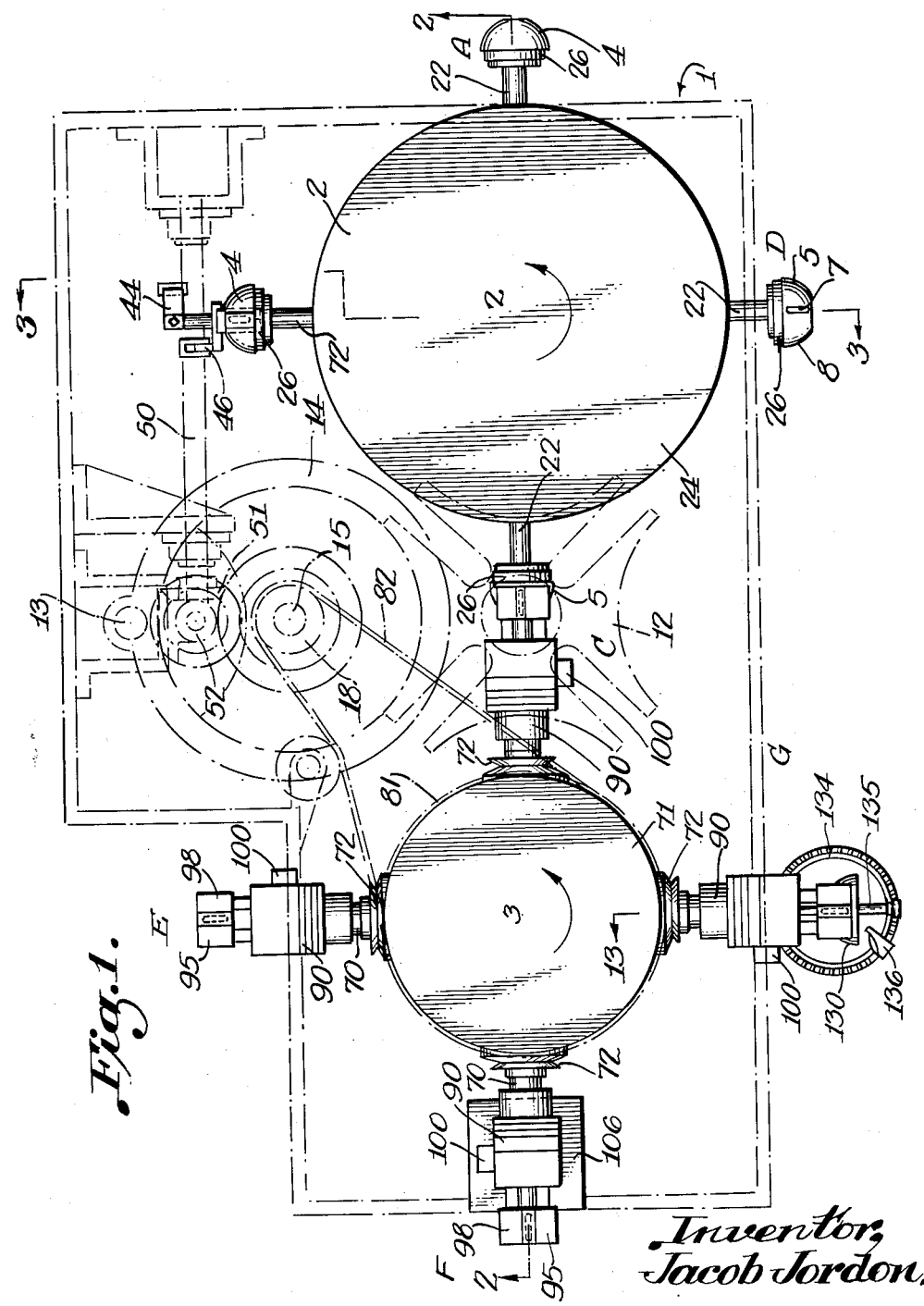

In the drawings, in which like reference characters refer to like parts, my machine comprises a general frame and case 1 on which are mounted a cup turret 2 and a handle turret 3. The cup turret 2 is provided with suitable cup chucks intermittently indexed from the cup loading station A to the turning station B to the handle sticking station C and thence to the handled cup unloading station D. The handle turret 3 is likewise provided with suitable chucks intermittently (and synchronously with the chuck of turret 2) indexed from the handle loading station E to the handle cutting station F to the handle dipping station G and thence to the handle sticking station C, where the orbit of the handle turret 3 intersects the orbit of the cut turret 2 and the handle carried by the turret 3 is applied to the cup carried by the turret 2. It is at this station C that each handle-carrying chuck releases the handle carried by it from the handle loading station E in order to permit the handle to be carried on its cup to the cup unloading station D.

The turrets 2 and 3 are mounted upon and indexed by turret shafts 20 and 30 stepped in the casing 1. Synchronous indexing of the shafts 20 and 30 and their corresponding turrets is obtained by the large shaft gears 21 and 31 which mesh with the jack shaft gear 11 mounted on the jack shaft 10. (See Fig. 2.) The jack shaft 10 is intermittently indexed through 90° by means of the Geneva gear 12 which is mounted on the jack shaft 10. The Geneva gear 12 is driven (see Fig. 3) by the single roller tooth 13 of the Geneva pinion 14 mounted on the constantly rotating main drive shafts 15, which is driven by sprocket and chain drive 16 from the main driving motor 17. In addition to synchronously indexing the turrets 2 and 3 intermittently through 90° by the above described Geneva drive and common jack shaft, the main drive shaft 15 also drives the handle turret timing mechanism by means of the small timer sprocket 18 and the cup-turning tool cam shaft drive by means of the cam shaft power take-off gear 19, the construction and operation of which mechanisms will be more fully described below.

Cup loading and turning stations

The cup turret 2 carries four horizontal, suitably journaled spindles 22, each carrying a friction gear 23 mounted on the spindles between spindle bearings carried by the housing 24 of the rotatable turret 2, the turret housing 24 being journaled for rotational movement on the bearing ring 25 carried by the casing 1. As shown in Figs. 2 and 3 of the drawings, the lower peripheries of the spindle friction gears 23 extend through suitable slots in the base of the turret housing into the annular space provided between the bottom of the turret housing and the adjacent top of the casing 1. Mounted on the ends of the spindles 22 which project beyond the turret housing 24 are the cup chucks 26 on which the green jiggered cup blanks 4 are mounted at the cup loading station A.

The cup chucks 26 are simply turned hardwood blocks having the desired contour of the inside of the finished cup 8 which is eventually to be produced. The tempered cup blank 4 has been previously jiggered so that the contour of its inside surface is substantially the same as the contour of the outside of the cup chuck 26. To mount the cup blank 4 on the chuck 26, the blank is simply pressed on the mating surface of the spinning chuck until, the blank being rather loosely held in the loader's hand, the frictional grip and adhesion of the blank 4 to the chuck 26 turns the blank in the operator's hand. The blank is thereby securely held on the chuck for the subsequent turning and handling operations.

To spin the chucks 26 at station A and effect the loading of the cup blanks on the chucks 26, a friction gear 27 is hung beneath the top of the case 1 in suitable bearings so that the upper periphery of the gear will extend, through a suitable slot in the case, into the annular space between the turret housing 24 and case 1, where the gear 27 contacts, in driving engagement, the periphery of a spindle friction gear 23. The gear 27 is driven continuously by a friction drive gear 28 on the shaft of the cup turret spindle drive motor 29 mounted in a suitable housing in the case 1. As the turret 2 is indexed so that an unloaded chuck 26 is brought to station A, its spindle gear 23 is, therefore, brought into driving engagement with the constantly driven friction gear 27, which brings the spindle 22 up to speed and continues to drive the spindle so long as it remains at station A.

As a spindle 22, its chuck 26 loaded with a cup blank 4, is indexed to the cup turning station B, it may decelerate somewhat, but it is quickly brought back up to speed as its gear engages the friction gear 47, hung at station B in a manner similar to the mounting of the friction gear 27 at station A. The friction gear 47 (see Fig. 3) is driven continuously by a friction drive gear 48, which, in turn, is driven by the flexible shaft 49, which is bent around the turret shaft 20 and connected to the shaft of the spindle driving motor 29.

At the cup turning station B the jiggered cup blank 4 is engaged and cut by the cup body turning tool 40, mounted on its compound cam levers comprising the advancing lever 41 and the oscillating lever 42. The body turning tool 40 shapes the outside of the cup blank 4 to the desired outside contour of the cup body. As the turning tool 40 reaches its maximum advanced position to make its finishing cut, the lip turning tool 43, mounted on its cam lever 44 and the foot facing tool 45, mounted on its cam lever 46, are advanced to turn the lip and finish the foot of the blank 4. Upon completion of the cuts made by the tools 43 and 45, all the turning tools 40, 43, and 45 are retracted, the cup blank 4 having been turned and becoming the cup body 5, and the turret is indexed to carry the turned cup body to the handle sticking station C.

The advancement and retraction of the several cup turning tools within the period a spindle 22 remains at the turning station B is controlled by the several tool cams mounted on the tool cam shaft 50, which is driven through the bevel gearing 51 by the cam jack shaft 52. The cam jack shaft 52 is, in turn, driven by its gear 53 which meshes with the cam shaft power take-off gear 19, mounted on the main drive shaft 15, as stated above. The several tool operating cams are indexed in the cam shaft to operate as stated above and are as follows (referring particularly to Figs. 4 to 7):

The cup body turning tool 40 is operated through its compound levers 41 and 42. The tool advancing lever 41 is pivoted on the bracket 54 and carries the roller follower 55 which follows the disk cam 56 to raise and lower the pivoted oscillating lever 42, the follower 55 being held on the edge of the cam 56 by the tension spring 57. The cam 56 is substantially an eccentric cam and may be provided with a slight dwell at its locus of maximum throw to provide a finishing cut as the tool 40 reaches its maximum advance. The end of the cam lever 41 carries the pivot 58 for the oscillating cam lever 42, on the upper end of which the cup body turning tool 40 is mounted. The lower end of the cam lever 42 is provided with a roller follower 59 which engages the edge of the scalloped disc cam 60, the follower 59 being held against the cam 60 by the tension spring 61.

As is apparent from the foregoing and from Fig. 5 of the drawing, the cam lever 41 carries the oscillating lever 42 to raise and lower and thus advance and retract the cutting tool 40 to trim off the excess clay in the cup blank 4. However, as the tool 40 is advanced by the lever 41, it is also oscillated about the pivot 58. The effect of the oscillation of the tool 40 is to roll the tool axially along the surface of the blank 4 being cut, so that at any one instant, only a relatively short portion of the contoured cutting edge of the tool 40 is in actual cutting and shearing contact with the clay of the blank 4. The effect of the oscillation of the tool 40, therefore, is to produce, without actually advancing the tool axially, an axially advancing helical cut similar to that taken when cups are turned manually and the turner moves his manually held tool axially. By this means this invention avoids the tearing of the clay and slippage on the chuck which has heretofore been encountered when it has been attempted to turn the cup with a contoured tool corresponding to the desired contour of the cup body. It is to be noted that the contour of the cutting edge of the tool 40 (Fig. 5) does not correspond to the cut surface of the blank 4 but is an evolved curve based upon the desired contour of the cup wall but modified by the effect of the oscillation and advancement of the cutting tool.

The turning of the lip of the cup is normally the last operation in the turning of a cup body by hand, but in this machine it may be performed substantially with the foot-forming operation. Because only a narrow cut is taken in turning the lip, no oscillation of the tool is necessary, nor is the reversal of the spindle necessary, as is customary in hand-turning, the lip cut being taken by the hook-shaped cutting edge of the tool 43 as it is advanced by its lever 44. The lever 44 is offset from the center line of the spindle 22 to extend through a suitable opening in the case 1, where its advancement and retraction is controlled by the lip-turning cam 62, the lever 44 being pivoted on the pivot 63 and provided with a roller cam follower 64. The follower 64 is held against the edge of the cam 62 by a suitable tension spring 65. Because the movement of the lip turning tool 43 is a simple advancement and retraction, the cam 62 is substantially an eccentric disc, as shown.

The foot in the cup blank 4 is formed by a face cut, preferably taken by the foot facing tool 45 substantially simultaneously with the lip turning operation. The foot facing tool lever 46 is offset oppositely to the offset of the lip tool lever 44 and extends through a suitable opening in the casing 1, where its advancement and retraction is controlled by the foot facing disc cam 66, the lever 46 being pivoted on the pivot 67 and provided with a roller follower 68. The follower 68 is held against the end of the disc cam 66 by means of a suitable tension spring 69. (The several follower-operating tension springs 61, 65, and 69 are omitted in Fig. 3 for sake of clarity.) Because the blank 4 exerts little torque upon the foot facing tool 45, the tool 45 is contoured to the desired contour of the foot, the tool being advanced at the desired rate and then held at its point of maximum advance by the dwell shown in the cams 66 in order to provide a finish cut.

*Cup handling turret and handle chuck arm timing*

Since the turned cup body 5 indexed from the station B is prepared to receive the cup handle at the station C the preparation of the cup handles will be described as follows:

The cup handle turret 3 carries four handle chuck arms 70 spaced at 90° with respect to each other and pivoted within the cup turret housing 71. The arms 70 extend outwardly through the housing 71 to support the handle chucks 90, the arm openings in the housing 71 being closed by the flexible boots 72. The chucks 90 overbalance the arms 70 and would pull them to an angular position below the horizontal positions shown in the drawings but for suitable stops provided at the several handle stations E, F, and G and the engagement of the cut handle 7 with the cup body 5 at the handle sticking station C, where the overbalancing weight of the chucks 90 serves to press the cut handles against the cup bodies.

Just before the turret 3 is indexed to advance the chucks 90 to the succeeding stations, however, the arms 70 are pivoted to raise the chucks above the horizontal positions shown and to maintain the chucks in such elevated positions until just after indexing of the turret 3 is completed, at which time the chucks 90 are lowered to their operative horizontal positions.

The raising and lowering of the chucks 90, to permit the indexing of the turret 3 without damage to the chucks and the handles carried thereby, is accomplished by means of the tappets 73 which are urged downwardly by the compression springs 74 engaged between suitable collars 75 on the tappets and the base of the housing 71 in which the tappets are journaled for vertical sliding movement, downward movement of the tappets 73 being limited by engagement of the collars 75 with the timer ring bearing collar 76 which is fixed to and rotates with the turret shaft 30.

The tappets are provided at their lower ends with suitable followers and, at each of the handle turret stations, constantly rotating tappet cams 77, mounted on axles hung from the casing 1, are located below the indexed tappets. The tappet cams 77 are so indexed on their axles that their minimum throw surfaces are uppermost as the turret 3 is indexed. Thus, as the falls of the cams 77 lower the tappets 73, the tappet heads engage the ends of the arms 70 and raise the chucks 90. When the turret 3 is indexed, the tappet followers each leave one tappet cam 77 and become located over the tappet cam 77 at the succeeding station. Then, with the several tappets positioned, the rises of the tappet cam and become located over the tappet cam 77 at springs 74 and lowering the chucks 90 to their operative horizontal positions as shown.

The rotation of the tappet cams 77 is accomplished by means of the beveled spider pinions 78 which are driven by the ring bevel gear 79 of the timer ring 80, which is rotatably journaled on the timer ring bearing collar 76. The timer ring 39 is provided with the large sprocket gear 81 which is driven by the main drive shaft 15 through the small timer sprocket 18 and the sprocket chain 82. The gear ratio of the drive from the main drive shaft 15 to the tappet cams 77 is such that the cams 77 make four revolutions during each cycle in which the turret 3 is indexed through 360° or, in other words, the cams 77 make one revolution during each index phase.

*Handle chuck*

As best shown in Fig. 9, the handle chuck 90 comprises a hub 83 mounted on the arm 70 and which carries a rotatable plate 84 mounted on a bearing 85 press-fitted into the hub 83. The plate 84 carries a spring-pressed ball 86, which, when engaged in its mating recess in the hub 83, latches the chuck casing 87 (carried by the plate 84) in its normal position shown in the drawings. A sharp tug, however, permits the plate 84 and its casing 87 to be rotated in the bearing 85.

Figure 10:
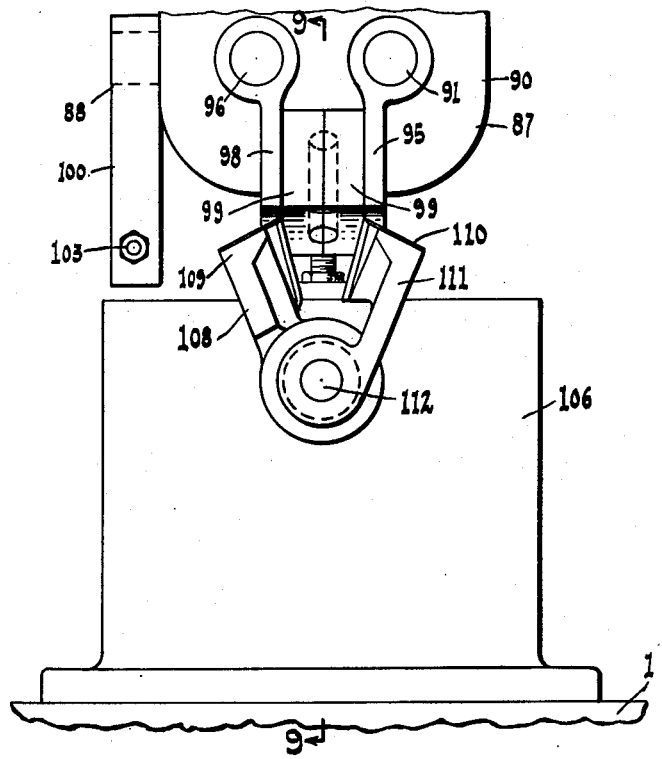
Fig. 10 is a detail elevation at the handle trimming station taken from the plane of line 10—10 of Fig. 2.
Figure 11:
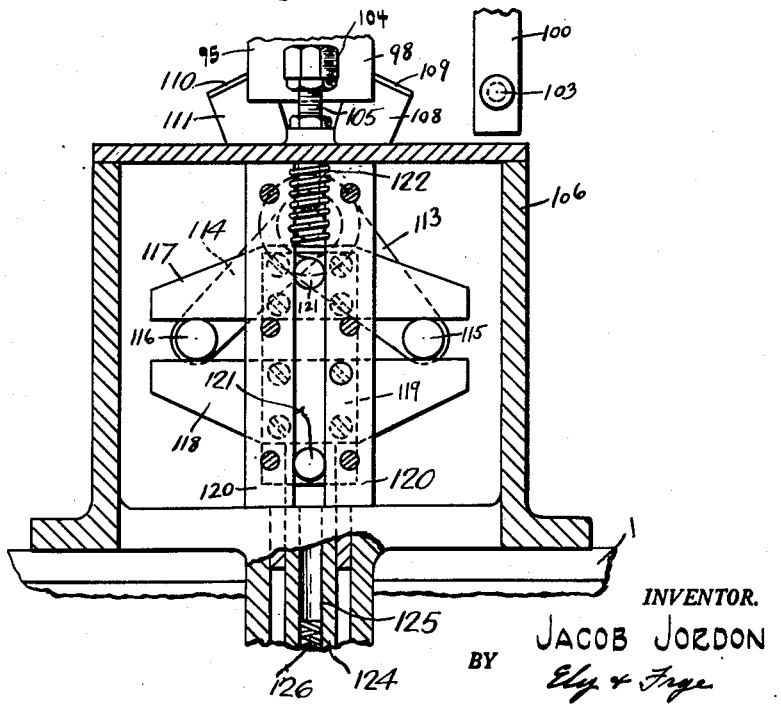
Fig. 11 is a detail in section taken from the line 11—11 of Fig. 9.

Extending lengthwise in the casing 87 is the suitably journaled main chuck jaw shaft 91 provided along its inside and toward the rear of the casing with a spline 92. At the forward end of the casing 87, the main jaw shaft 91 is provided wth a jaw pinion 93 and between the pinion 93 and the spline 92, the shaft 91 runs through a coiled torsion spring 94 engaged between the spline 92 and the casing 87. The torsion spring 94 urges the pinion 93 and the chuck jaw 95 carried by shaft 91 to turn in a clockwise direction. Journaled in the forward end of the casing 87 is a spur jaw shaft 96 carrying, on its inner end, a spur pinion 97 which meshes with the main shaft pinion 93. The forward end of the spur shaft 96 carries a chuck jaw 98 which mates with the chuck jaw 95. As best indicated in Figs. 9 and 10, the chuck jaws 95 are each lined with recessed blocks of relatively soft rubber or a like elastomer molded to fit in the jaws 95 and 98 and to receive and hold firmly a cast cup handle blank 6, the recesses in the blocks 99 being so oriented that the handle blanks held in them when the chuck jaws are closed will be positioned to be cut to the proper contour by the contoured knives 109 and 110 at the handle cutting station F.

Due to the torque exerted by the spring 94, the jaw 95 is urged to rotate in a clockwise direction, but movement beyond the vertical closed position shown in the drawings is limited by the jaw 98, urged in a clockwise direction by the spring 94 through the pinions 93 and 97. By properly indexing the jaws 95 and 98 on the shafts 91 and 96, closing of the jaws in the vertical position shown in the drawings is assured, the effect of possible backlash as the pinions wear being eliminated, if desired, by a suitable counter torsion spring (not shown) acting directly upon the shaft 96 and urging it in a counter-clockwise direction independently of the drive of the spring 94 through the pinions 93 and 97.

The chuck jaws 95 and 98 are opened by means of a short transverse shaft 88 journaled in the casing 87 behind the spur jaw shaft 96, the transverse shaft being urged in a counter-clockwise direction by a torsion spring 89 considerably weaker than the spring 94. At its outer end the shaft 88 carries a normally depending chuck lever 100 and at its inner end the shaft 88 is provided with a hub 101 carrying an extending eccentric cam pin 102 held against the spline 92 by the spring 89. Forcing of the depending cam lever in a counter-clockwise direction, i.e. toward the chuck jaws, therefore, causes the pin 102 to cam the spline 92 and the main jaw shaft against the torque of the spring 94 and thereby opening the chuck jaws 95 and 98. To permit precise operation of the jaw lever 100 by the opening cam lever 144 at the handle sticking station C, the lower end of the lever 100 carries the adjustable pressure bolt 103.

*Handle loading and cutting stations*

Cast green clay handle blanks 6, suitably dried and tempered for cutting, are delivered to the handle loading operator stationed at the handle loading station E. Because it would be difficult to load the handle blanks 6 into the chucks 90 with the chuck jaws in their normal vertical depending position, the operator snaps the chuck 90 indexed at station E around until the jaws are in a substantially horizontal position, the ball 86 unlatching to permit the chuck to rotate in its bearing 85. Then, pulling the chuck lever 100 forward toward her with one hand, she loads a handle blank 6 in the recess of a rubber block 99 with the other hand. Then, upon releasing the lever 100, the chuck jaws close to hold the blank 6. Either by gravity or with a twist imparted by the loading operator, the chuck is turned and latched in its normal position, usually well before the turret 3 commences to index and advance the loaded chuck to the handle cutting station F.

Automatic opening and closing of the chuck jaws may be obtained in some modifications by a suitable dog (not shown), mounted on top of the case 1, which strikes an abutment on the bottom of the chuck casing 87 to turn the lower jaw to a horizontal position as a chuck arm 70 approaches the unloading station; engagement of the pressure bolt 103 with a suspended cam track opening said jaws by the time the chuck reaches its fully indexed position at station E. Then with the handle blank placed on a chuck jaw, indexing of the chuck to station F carries the pressure bolt 3 past the suspended cam track to close the chuck jaws and a curved rack on the case 1, engaging a segmental gear on the casing 87, rotates the chuck jaws around to their normal dependent vertical position before the chuck reaches the station F. In some modifications where a reversing gear is interposed between the jack shaft gear 11 and the turret gear 31 and the stations E and G are accordingly interchanged, the cam track for operating the chuck lever 100 may be mounted on the case 1, rather than being suspended above the orbit of the chucks.

As a chuck 90 approaches the cutting station F, the tappets 73 lower the chuck onto the adjustable stop nut 104 threaded on the stop stud 105 extending into the cutting knife mechanism housing 106 mounted on the case 1.

Journaled in the housing 106 is the knife sleeve 107 which carries at its outer end the outwardly extending contoured knife block 108 on which the contoured knife 109 is mounted. The mating contoured knife 110 is mounted on the knife block 111 carried by the outer end of the knife shaft 112 journaled in the sleeve 107. The inner end of the sleeve 107 carries the offset crank arm 113 extending on the same side of the sleeve 107 as the knife block 108, which it operates. The inner end of the shaft 112 carries the crank arm 114, likewise extending on the same side of the shaft 112 as the knife block 111 which it operates. The spread ends of the crank arms 113 and 114 are provided with yoke pins 115 and 116, respectively, which are retained in the yoke comprised of the horizontal yoke members 117 and 118 of the cross-head 119. The cross-head 119 is, in turn, mounted for vertical sliding movement by means of the pins 121 which slide in the vertical ways 120 carried by housing 106.

The cross-head 119 is normally urged downwardly by the compression spring 122 engaged between the housing 106 and the upper yoke member 117 and guided by the stop stud 105. Downward movement of the cross-head is limited by the telescoping cam follower 123 which engages the lower yoke member 118 and comprised of a sleeve 124 journaled in the housing 106 and the capped rod 125 journaled in the sleeve 124, the rod 125 being urged out of the sleeve 124 by means of the compression spring 126. Telescopic movement of the rod 125 out of the sleeve 124 is limited by the limit screw 127 received in a slot in the rod 125. The lower end of the follower sleeve 124 is provided with roller 128 which engages the edge of the cutter cam 129 carried on the outer end of the axle of the beveled spider gear 78 located at station F.

Since the spider gears 78 make one complete revolution during each indexing phase, the cam 129 closes the opposed cutting knives, contoured to the same shape as that of the cup body 5, once during each indexing phase by raising the cam follower 123 and the cross-head 119 to further spread the crank arms 113 and 114 by means of the yoke members 117 and 118 and thereby close the normally open knives 109 and 110. The upward movement of the cross-head 119 is limited by the engagement of the upper yoke member 117 by the stop stud 105, which is adjusted so that it will stop the upward travel of cross-head 119 just as the edges of the knives 109 and 110 are about to touch, thereby preventing the knife edges from being dulled by being banged together by the cam 129. To insure that the knives are closed, an overtravel in the cam throw is provided for, such overtravel being taken up by the spring 126 in the telescoping follower 123 and the spring 126 being somewhat stiffer than the compression spring 122. As the cam follower commences to drop, the spring 122, which also serves to cushion the stop of the cross-head 119, forces the cross-head downwardly, closing the spread crank arms 113 and 114 and thereby opening the knives 109 and 110 for the next indexing phase.

Because the clay handle blanks 6 are held firmly in the chuck jaws up to the locus of the desired cut and because the knives 109 and 110 move together against opposite sides of the enlarged protruding ends of the handle blanks, the clay is supported during the cut and clearly and precisely cut handles 7 are obtained from the blanks 6.

*Handle dipping station*

When a chuck 90 loaded with a cut handle 7 is indexed to the handle dipping station G, it is brought to rest and supported at the desired horizontal elevation by the adjustable stop bolt 131 carried by the bracket 132 mounted on the case 1. The stop bolt 131 supports the chuck 90 so that the slightly protruding cut ends of the handle 7 do not quite touch the upper area of the constantly rotating dipping form 130 contoured to the shape of the cup body 5 but the ends are coated with a film of wet clay slip 9 picked up by the lower area of the rotating form 130 as it is turned in the bath of slip 9 in the rotating container 134. The form 130 is supported on an axle 135 which is supported at its inner end by the bracket 132 and at its outer end by the staff 133 supported on the gear case 137. Adjacent the bracket 132 the axle 135 carries a beveled pinion 138 which meshes with a beveled ring gear 139 carried on the outside of the rotating container 134. The container is pinned to a plate 147 carried above the gear case 137, the vertical shaft 140 journaled therein. The shaft 140 carries within the gear case 137 a bevel gear 141 which meshes with a bevel gear 142 mounted on an extended axle 143 of the beveled spider pinion 78 located at station G. In order to prevent the slip 9 from settling in the container, a stationary steel strap 136, supported at its ends on the gear case 137, is bent up over the edges of the container 134 and down into the body of slip within the container, serving as a stationary paddle to stir the slip 9 carried in the container 134.

*Handle sticking station and unloading station*

When a cut and dipped handle 7 is indexed from station G to the handle sticking station C, it is lowered, by operation of the tappet 73, onto the cup body 5 carried on the chuck 26 which was indexed to station C simultaneously with the indexing of the arm 70 which carries the handle in its chuck 90. To insure that the arm 70 and the spindle 22 are aligned above each other and are not still moving toward each other at the instant the handle 7 is pressed on the body 5 by the weight of the chuck 90, the lower portion of the tappet cam 77 at station C may be made a little longer than on the other tappet cams.

The clay slip 9 carried on the cut ends of the handle 7 is generally sufficient to adhere the contoured cut areas to the cup body 5 under the weight of the chuck 90, but to insure that the cut surfaces of the handle 7 are brought into positive contact with the freshly cut cup body 5 and also to work the clay of the cut handle, still slightly plastic and moistened by the slip 9, so that any disconformity between the contour of the cup and the contour of the cut handle ends will be worked out, it is desirable to rub the handle 7 slightly on the body 5.

Rubbing is obtained by means of a flexible shaft 33 connected, beyond the opening cam 32, to the end of the axle carrying the beveled spider pinion 77 located at station C. The flexible shaft 33 is bent around the jack shaft 10 and its other end is connected to a rubbing cam shaft 34 hung below the spindle 22 at station C. The end of the cam shaft 34 is provided with a hub 35 on which is located a small camming bump 36. A friction gear 37 is hung in the casing 1 beneath the turret 2 to engage the friction gear 23 of a spindle 22 in the same manner as the friction gears 27 and 47 are hung at stations A and B. The friction gear 37, however, is provided with an eccentric roller 38 and a tension spring 39 connected between the rim of the gear 37 and a suitable portion of the case 1, the tension spring 39 preventing the gear 37 from revolving and resiliently holding the eccentric roller 38 against the hub 35. It should be noted that the friction gear 37, being so held by the spring 39, by engagement with the spindle friction gears 23, serves to brake and stop the spindles 22, which may still be rotating as they are indexed to station C.

Since the beveled spider pinions make one complete revolution during an indexing phase, the camming bump 36 will strike the eccentric roller 38 sharply once while a spindle 22 is at station C, thereby moving the cup 5 sharply, while it is being pressed with the cut and dipped handle, through a few degrees and then back to its initial position. The forward movement of the cup is transferred from the camming action of the bump 36 through the gears 37 and 23 to the spindle 22. The return movement is caused by the retraction of the spring 39 as the bump 36 moves past the roller 38. The slight rubbing of the cut ends of the handle on the cup body 5, so obtained, insures a firm adherence of the handle to the cup body.

When adhered to the cup body 5 to form the completed cup 8, the handle 7 must be freed from the jaws of the chuck 90. This is accomplished by means of a cylindrical opening cam 32 mounted on the end of the same bevel spider pinion axle to which the flexible shaft 33 is connected. The opening cam lever 144 extends through an opening (closed by a flexible boot 145) in the case 1, on which it is pivoted and extends upwardly to a point alongside the chuck casing 87 and behind the pressure bolt 103 of the chuck lever 100 of the chuck 90 at station C. (The chuck 90 is raised above the cam lever 144 and passes over it as the chuck is indexed to station C.) The lower end of the opening lever 144 is provided with a roller which is held on the cylindrical face of the cam 32 by a tension spring 146. Just before the turrets 2 and 3 are indexed and before the tappet 73 raises the arm 70, but after the handle 7 has been rubbed on the cup body 5, the roller of the opening lever 144 is pulled into the dip 147 of the cam 32, thereby pushing the chuck lever 100 forward and opening the chuck jaws which had held the handle. At that instant the tappet 73 commences to raise the chuck 90 and the turrets begin to index. Since the spindle gear 23 of the spindle 22 is engaged with the fixed friction gear 37, the spindle 22 rotates as the turret 2 is engaged, rolling the cup handle 7 down as the opened chuck jaws rise and move to the handle loading station E. Thus, the handle 7 on the finished cup is cleared from the jaws of the chuck 90 as the turrets index.

When the spindle 22 reaches the unloading station D, the unloading operator simply grips the top of the finished cup 8 in her finger tips, removes it from the chuck 26 and passes it to a sponger, who fettles off any turning tool marks or the like before placing the handled cup on the conveyor or ware board employed to carry the cups to the drier preparatory for firing in the kiln.

From the foregoing it is evident that various elements of the preferred embodiment of my cup handling machine may be altered or modified and that the various sub-combinations, such as the turning mechanism, handle cutting mechanism, handle dipping mechanism, and the handle sticking mechanism may be built separately and prove to be of utility apart from the entire combination disclosed. My invention, therefore, is not limited to the specific embodiment disclosed but may be modified and varied within the scope of the following claims without departing from the purpose and spirit thereof.

What is claimed is:

1. In a cup turning and handling machine, means to convey a green cup body from a cup loading station to a cup body turning station and thence to a cup handling station, means to turn said cup body at said turning station, means to cut and shape said cup body at said turning station as said cup body is turned, means to convey a green cup handle from a loading station to a handle cutting station, and thence to said handling station, means to cut said handle at said handle cutting station, the courses of said cup body conveying means and said cup handling conveying means coinciding at said cup handling station to press and adhere cup handles on cup bodies thereat, and means to cause one of said conveying means to release at said handling station.

2. In a cup turning and handling machine, a cup body turret, a cup body chuck carried by said body turret adapted to convey a green cup body successively from a body loading station to a cup turning station and thence to a cup handling station, means to turn said cup body at said turning station, means to cut and shape said cup body at said turning station as said cup body is turned, a cup handle turret, a handle chuck carried by said turret adapted to convey a green cup handle successively from a handle loading station to a handle cutting station, to a handle dipping station, and thence to said cup handling station, means to cut said handle at said handle cutting station, means to dip said handle at said handle dipping station, means to rotate said turrets synchronously, said turrets being spaced with respect to each other to provide tangent orbits of the body and handle carried by said respective chucks at said handling station, and means to adhere the handle to the cup body and release the handle from said handle chuck while said chucks are at said handling station and before said body chuck conveys the handled cup body away from said handling station.

3. A machine as defined in claim 2 including means to rub the handle and body with respect to each other for an instant while the handle and body are held tangent to each other at said handling station.

4. In a cup handling and turning machine, a body turret and a handle turret; rotatable spindles carried by said body turret and cup body chucks on said spindles, means to index said spindles intermittently from a body loading station to a body turning station, and thence to a cup handling station, means to rotate said spindles at said turning station, cup turning tools at said turning station and means to advance and retract said turning tools against a green cup body to turn the same; handle chuck arms mounted on said handle turret, handle chucks carried on said arms, means to index said handle turret synchronously with said cup turret and to convey handles carried by said chucks successively from a loading station to a handle cutting station, to a handle dipping station and thence to said handling station so that a cut cup handle and a turned cup body arrive at said handling station substantially simultaneously, said cup turret and said handle turret being spaced with respect to each other so that the orbits of the cup bodies and the cup handles are tangent at said handling stations, means to lift said chuck arms as said handle turret is moved from said dipping station to said handling station and lower said arm at said handling station and thereby press the cut cup handle on the turned cup body at the handling station, means to rub the cup body against the cut cup handle for an instant while said handle and body are at said handling station and thereby complete the adherence of the handle to the body, means to release the handle from the handle chuck after the adherence of the handle to the body and at least as soon as the cup chuck is indexed away from the handling station.

5. A cup turning and handling machine as defined in claim 4, in which said chuck comprises a pair of chuck jaws normally closing against each other but at least one of said jaws being swingable away from a closed position to release a handle engaged therein, soft resilient material carried in the faces of said jaws, said material having mating recesses to receive all but the ends of a green cup handle and to support the green cup handle so that the ends thereof protrude from the chuck jaws.

6. In a cup turning and handling machine as defined in claim 5 including a pair of normally open, opposed contoured knives at said handle cutting station, means to move said knives toward each other in a closed position lying in the plane defined by the faces of the closed chuck jaws when a chuck is indexed at the cutting station, a chuck indexed at said cutting station being spaced with respect to said knives so that said knives, when closing, trim the protruding ends of a cup handle carried by the chuck by cutting toward the center of the handle ends.

7. In a cup turning and handling machine as defined in claim 6, a container at said handle dipping station adapted to receive clay slip, a transfer form mounted above said container, said transfer form having a contour similar to that of a turned cup body to which a handle is to be applied, and means to rotate said form about an axis so that a portion of said form on one side of said axis receives a coating of slip from said container, said form being mounted so that said slip on said rotated form is applied to the cut ends of a cup handle carried by a chunk indexed at said handle dipping station.

8. A cup handling and turning machine as defined in claim 7, including means for pivotally mounting said chucks on said chuck arms, and means normally but releasably holding each chuck at a fixed position on its supporting arm, whereby said chucks may be pivoted from their normal fixed position at said cutting, dipping and handling stations to facilitate the loading of green cup handles in said chuck jaws.

9. A cup handling and turning machine as defined in claim 8, in which said turning tools at said turning station comprise a foot facing tool, a lip cutting tool and a body cutting tool, and said means to advance and retract said body tool include means to rock said body tool as it is advanced, said body tool having a cutting edge contoured so that the desired cup body contour cut by said tool is the contour generated by the combined contour of the cutting edge and the rocking movement of the cutting tool.

10. A cup handling and turning machine as defined in claim 9 including means operating the cutting tool advancing and retracting means in timed relationship with the cup turret indexing means to advance and retract said tools during a period in which a cup body chuck is indexed at said cutting station.

JACOB JORDAN.

REFERENCES CITED

The following references are of record in the file of this patent:

UNITED STATES PATENTS

| Number | Name | Date |
|---|---|---|
| 532,636 | Broone | Jan. 15, 1895 |
| 1,023,569 | Juengst | Apr. 16, 1912 |
| 1,283,275 | Nye | Oct. 29, 1918 |
| 1,301,721 | McElroy et al. | Apr. 22, 1919 |
| 1,762,387 | Dengler | June 10, 1930 |
| 2,148,871 | Miller | Feb. 28, 1939 |
| 2,224,653 | Lane et al. | Dec. 10, 1940 |
| 2,309,726 | Zalewski et al. | Feb. 2, 1943 |
| 2,361,312 | Miller | Oct. 24, 1944 |
| 2,374,339 | Emerson | Apr. 24, 1945 |
| 2,374,556 | Miller et al. | Apr. 24, 1945 |
| 2,413,540 | Bloore | Dec. 31, 1946 |
| 2,455,744 | Emerson | Dec. 7, 1948 |
| 2,474,509 | Allen | June 28, 1949 |
| 2,478,812 | Drake | Aug. 9, 1949 |

FOREIGN PATENTS

| Number | Country | Date |
|---|---|---|
| 345,240 | Great Britain | Mar. 18, 1931 |